United States Patent
Bojinov et al.

(10) Patent No.: US 9,395,929 B2
(45) Date of Patent: Jul. 19, 2016

(54) NETWORK STORAGE SERVER WITH INTEGRATED ENCRYPTION, COMPRESSION AND DEDUPLICATION CAPABILITY

(75) Inventors: Hristo Bojinov, Redwood City, CA (US); Ananthan Subramanian, Menlo Park, CA (US)

(73) Assignee: NetApp, Inc., Sunnyvale, CA (US)

( * ) Notice: Subject to any disclaimer, the term of this patent is extended or adjusted under 35 U.S.C. 154(b) by 2305 days.

(21) Appl. No.: 12/110,046

(22) Filed: Apr. 25, 2008

(65) Prior Publication Data
US 2009/0268903 A1 Oct. 29, 2009

(51) Int. Cl.
| | |
|---|---|
| H04L 29/00 | (2006.01) |
| G06F 3/06 | (2006.01) |
| G06F 11/14 | (2006.01) |
| G06F 12/08 | (2016.01) |
| H04L 9/08 | (2006.01) |

(52) U.S. Cl.
CPC .............. *G06F 3/0622* (2013.01); *G06F 3/067* (2013.01); *G06F 3/0625* (2013.01); *G06F 3/0641* (2013.01); *G06F 11/1453* (2013.01); *G06F 12/0866* (2013.01); *H04L 9/0836* (2013.01); *H04L 9/0894* (2013.01); *G06F 2212/264* (2013.01); *G06F 2212/401* (2013.01); *H04L 2209/30* (2013.01); *H04L 2209/60* (2013.01); *Y02B 60/1246* (2013.01)

(58) Field of Classification Search
USPC .......................................... 713/150, 164–167
See application file for complete search history.

(56) References Cited

U.S. PATENT DOCUMENTS

| | | | |
|---|---|---|---|
| 5,963,642 | A | 10/1999 | Goldstein |
| 5,990,810 | A | 11/1999 | Williams |
| 6,134,660 | A | 10/2000 | Boneh et al. |
| 6,604,118 | B2 | 8/2003 | Kleiman et al. |

(Continued)

FOREIGN PATENT DOCUMENTS

| | | |
|---|---|---|
| WO | WO-0106374 A2 | 1/2001 |
| WO | WO-2005050383 A2 | 6/2005 |

OTHER PUBLICATIONS

Kazeon Information Server, IS1200-ECS, Kazeon Systems, Inc. Data Sheet, "Kazeon® Search the Enterprise," http://www.kazeon.com/library2/downloads/IS1200-ECSDataSheet.pdf, 2 pages, (Oct. 17, 2007).

(Continued)

*Primary Examiner* — Brandon Hoffman
*Assistant Examiner* — Helai Salehi
(74) *Attorney, Agent, or Firm* — Gilliam IP PLLC

(57) ABSTRACT

A network storage server receives multiple write requests from a set of clients via a network and internally buffers multiple data blocks written by the write requests. At a consistency point, the storage server commits the data blocks to a nonvolatile mass storage facility. The consistency point process includes using a storage operating system in the network storage server to compress the data blocks, encrypt selected data blocks, and store the compressed and (possibly) encrypted data blocks in the nonvolatile mass storage facility. Data blocks can also be fingerprinted in parallel with compression and/or encryption, to facilitate subsequent deduplication. Data blocks can be indexed and classified according to content or attributes of the data. Encryption can be applied at different levels of logical container granularity, where a separate, unique cryptographic key is used for each encrypted data container.

24 Claims, 13 Drawing Sheets

(56) References Cited

U.S. PATENT DOCUMENTS

| | | | |
|---|---|---|---|
| 6,678,828 B1 | 1/2004 | Pham et al. | |
| 6,931,530 B2* | 8/2005 | Pham et al. | 713/165 |
| 6,983,365 B1 | 1/2006 | Douceur et al. | |
| 7,047,420 B2 | 5/2006 | Douceur et al. | |
| 7,305,700 B2 | 12/2007 | Boynton et al. | |
| 7,428,642 B2* | 9/2008 | Osaki | 713/189 |
| 7,584,338 B1 | 9/2009 | Bricker et al. | |
| 7,627,756 B2 | 12/2009 | Fujibayashi et al. | |
| 7,840,537 B2 | 11/2010 | Gokhale et al. | |
| 7,904,732 B2 | 3/2011 | Cui et al. | |
| 2002/0099763 A1 | 7/2002 | Kondo et al. | |
| 2002/0103783 A1 | 8/2002 | Muhlestein | |
| 2003/0051172 A1 | 3/2003 | Lordemann et al. | |
| 2003/0177379 A1 | 9/2003 | Hori et al. | |
| 2004/0078566 A1 | 4/2004 | Barber et al. | |
| 2004/0230792 A1 | 11/2004 | McCarty | |
| 2005/0004924 A1 | 1/2005 | Baldwin | |
| 2006/0085636 A1 | 4/2006 | Osaki | |
| 2006/0126468 A1 | 6/2006 | McGovern | |
| 2006/0143476 A1 | 6/2006 | McGovern | |
| 2007/0136340 A1 | 6/2007 | Radulovich | |
| 2008/0005141 A1 | 1/2008 | Zheng | |
| 2008/0013830 A1 | 1/2008 | Patterson | |
| 2008/0063210 A1 | 3/2008 | Goodman et al. | |
| 2008/0082836 A1 | 4/2008 | Osaki | |
| 2008/0091655 A1 | 4/2008 | Gokhale et al. | |
| 2008/0140932 A1* | 6/2008 | Flynn et al. | 711/114 |
| 2009/0171888 A1 | 7/2009 | Anglin | |

OTHER PUBLICATIONS

Decru® A NetApp Company, Decru's Storage Security White Paper, Enterprise-Wide Storage Security with DataFort™ Appliances, http://www.decru.com/docs/businessdrivers/index.htm, 9 pages, (2005).

DataFort™ Platform, Decru DataFort™ Secrurity Appliances, Decru® A NetApp Company, http://www.decru.com/products/datafort0.htm, Product Description, 3 pages, (Mar. 12, 2008).

DataFort® E-Series Datasheet, DataFort™ E-Series (NAS & IP-SAN), Decru DataFort® E-Series Storage Security Appliances, Decru® A NetApp Company, http://www.decru.com/products/dsEseries.htm, 3 pages, (Mar. 12, 2008).

Decru—Lifetime Key Management Software, Secure, Automated Key Archival and Recovery, Decru® A NetApp Company, http://www.decru.com/products/lkm_software.htm, Product Description, 3 pages, (Mar. 12, 2008).

Kazeon Systems Information Server IS1200, Storage management, Gold Award, 2005 Products of the Year, http://searchstorage.techtarget.com/productsOfTheYearWinner/0,296407,sid5_gci1162811_lax302767_ayr2005,00.html, 2 pages, (Mar. 12, 2008).

Kazeon Information Server, IS1200-FRM, Kazeon Systems, Inc. Data Sheet, "Kazeon® Search the Enterprise," http://www.kazeon.com/library2/downloads/IS1200-FRMDataSheet.pdf, 2 pages, (Jun. 15, 2007).

Kazeon IS1200-FRM for Storage Optimization, Data Consolidation, Kazeon Systems, Inc. Data Sheet, "Kazeon® Search the Enterprise," http://www.kazeon.com/products2/is1200-frm.php, 2 pages, (Mar. 12, 2008).

Co-pending U.S. Appl. No. 12/110,114, filed Apr. 25, 2008.
Co-pending U.S. Appl. No. 12/113,122, filed Apr. 30, 2008.
Co-pending U.S. Appl. No. 12/113,143, filed Apr. 30, 2008.
International Search Report PCT/US2009/041457 dated Dec. 23, 2009; pp. 1-4.
International Search Report PCT/US2009/041459 dated Dec. 23, 2009; pp. 1-3.
International Search Report PCT/US2009/042173 dated Dec. 16, 2009; pp. 1-4.
Written Opinion PCT/US2009/041459 dated Dec. 23, 2009; pp. 1-3.
Written Opinion PCT/US2009/042173 dated Dec. 16, 2009; pp. 1-7.
Written Opinion PCT/US2009041457 dated Dec. 23, 2009; pp. 1-5.
Zhu, et al.; "Avoiding the Disk Bottleneck in the Data Domain Deduplication File System"; In Proceedings of the 6th USENIX Conference on File and Storage Technologies (San Jose, California, Feb. 26-29, 2008). M. Baker and E. Riedel, Eds. USENIX Association, Berkeley, CA; pp. 269-282.

Adya, A., "FARSITE: Federated, Available, and Reliable Storage for an Incompletely Trusted Environment," Microsoft Corporation, Dec. 2002, retrieved from http://research.microsoft.com/apps/pubs/default.aspx?id=67917 on Apr. 28, 2011.

Douceur, J., "Reclaiming Space from Duplicate Files in a Serverless Distributed File System," Microsoft Corporation, Jul. 2002, retrieved from http://research.microsoft.com/apps/pubs/default.aspx?id=69954 on Apr. 28, 2011.

Bolosky, W., "Single Instance Storage in Windows® 2000," Microsoft Corporation, Aug. 2000, retrieved from http://citeseerx.ist.psu.edu/viewdoc/download?doi=10.1.1.67.5656&rep=rep1&type=pdf on May 2, 2011.

Non -Final Office Action Mailed May 31, 2011 in Co-Pending U.S. Appl. No. 12/113,122, filed Apr. 30, 2008.
Non-Final Office Action Mailed Jan. 25, 2011 in Co-Pending U.S. Appl. No. 12/110,114, filed Apr. 25, 2008.
Non-Final Office Action Mailed Apr. 5, 2011 in Co-Pending U.S. Appl. No. 12/113,143, filed Apr. 30, 2008.
Non-Final Office Action Mailed Jul. 11, 2011 in Co-Pending U.S. Appl. No. 12/110,114, filed Apr. 25, 2008.
Final Office Action Mailed Aug. 5, 2011 in Co-Pending U.S. Appl. No. 12/113,143, filed Apr. 30, 2008.
Notice of Allowance Mailed Nov. 28, 2011 in Co-Pending U.S. Appl. No. 12/113,122 of Kogelnik, C., filed Apr. 30, 2008.
Non-Final Office Action Mailed Nov. 28, 2011 in Co-Pending U.S. Appl. No. 12/113,143 of Subramanian, A., filed Apr. 30, 2008.
Advisory Action Mailed Mar. 29, 2012 in Co-Pending U.S. Appl. No. 12/110,114 of Singh, A., et al., filed Apr. 25, 2008.
Notice of Allowance Mailed Jun. 20, 2013 in Co-Pending U.S. Appl. No. 12/113,143 of Bojinov, H., et al., filed Apr. 25, 2008.

* cited by examiner

NETWORK STORAGE SERVER WITH INTEGRATED ENCRYPTION, COMPRESSION AND DEDUPLICATION CAPABILITY

FIELD OF THE INVENTION

At least one embodiment of the present invention pertains to network storage systems, and more particularly, to a network storage server with integrated encryption, compression and deduplication capability.

BACKGROUND

Securing sensitive data in electronic, optical or other machine-readable form has been an ongoing problem for almost as long as computers have existed. Many types of data may be considered sensitive and therefore warrant security measures, such as social security numbers, credit card numbers, birth dates, etc. Consequently, various forms of encryption have been used in computer systems to protect sensitive data. As hackers and other wrongdoers become increasingly more sophisticated in their techniques for accessing sensitive data without authorization, the approaches to protecting such data must evolve to meet that threat.

In the last few years, awareness of the need to better secure data at rest has increased. "Data at rest" is defined as data that is stored in a persistent data storage facility, as opposed to data that is traversing a network or temporarily residing in computer memory to be read or updated. Data at rest can include archival files or reference files that are rarely if ever changed. Data at rest can also include data that is subject to regular, but not constant, change. Data at rest can include, for example vital corporate data stored on the hard drive of an employee's notebook computer, data on an external backup medium, data maintained in storage of a storage server on a storage area network (SAN) or in a network attached storage (NAS) environment, or data on a server of an offsite backup service provider.

One approach that has been developed for protecting data at rest in a network storage environment is to deploy a separate, dedicated security appliance between a network storage server and its clients. Data that is being sent from a client to the storage server to be written is intercepted and encrypted by the security appliance and then sent to the storage server, which stores the data in encrypted form. When a client requests to read the data, the security appliance authenticates the client, confirms that the client has access to the requested data, optionally logs the request, and then forwards the request to the storage server. The storage server retrieves the encrypted data from storage and sends it to the security appliance, which decrypts the data and sends the decrypted data to the client. One problem with this approach is that in many instances it is desirable for a storage server to perform various other operations on data, such as indexing, compression and deduplication. However, it is mathematically unfeasible if not impossible to implement these functions on encrypted data. Also, the addition of a security appliance increases cost, complexity and can negatively impact performance of the system.

Further, with the use of a separate security appliance there is a concern that some clients might not go through the security appliance, that is, they might have a different path to the data. The level of coordination required between all the parties to ensure that all paths to the data are encrypted is high. Additionally, the use of a separate security appliance complicates or prevents the use of caching devices in front of the storage server, because the security appliance tends to become a communications bottleneck.

BRIEF DESCRIPTION OF THE DRAWINGS

One or more embodiments of the present invention are illustrated by way of example and not limitation in the figures of the accompanying drawings, in which like references indicate similar elements and in which.

DETAILED DESCRIPTION

Figure 1:
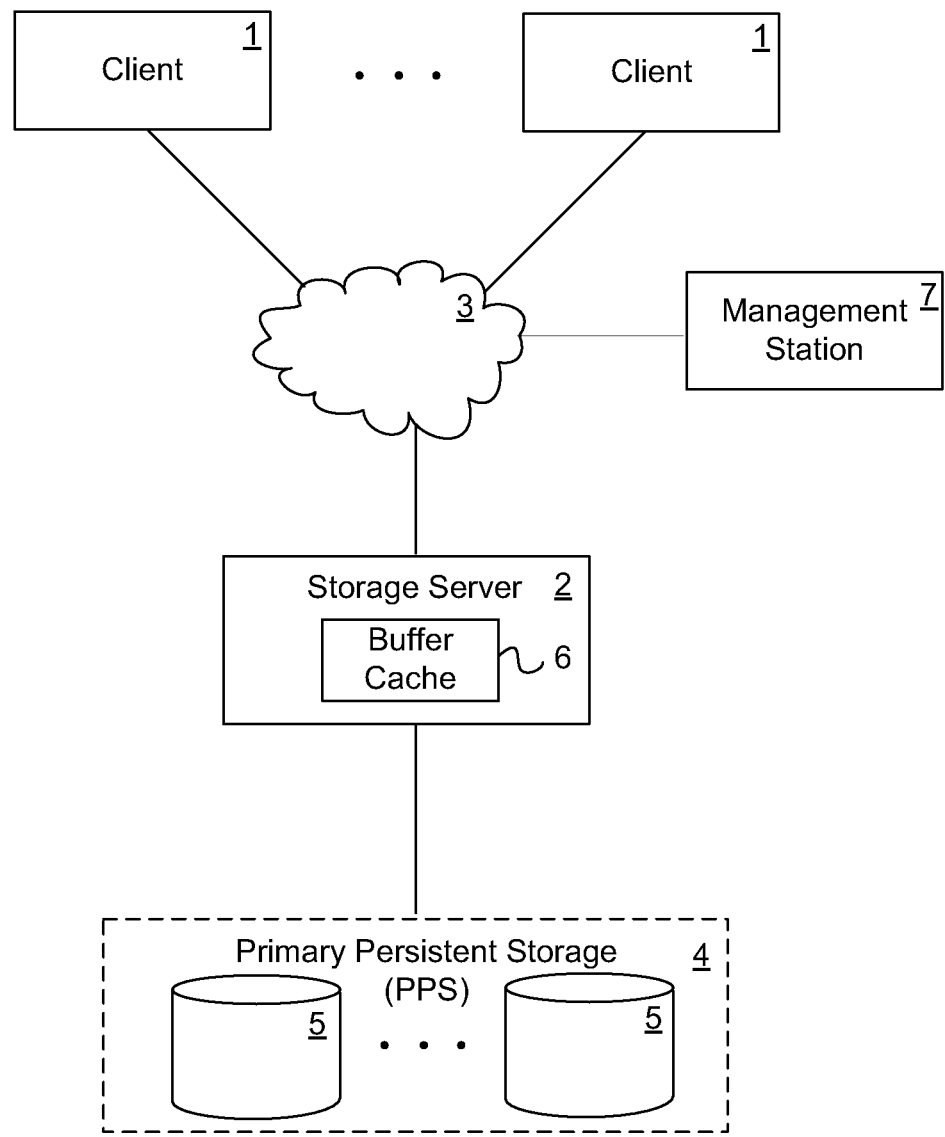
FIG. 1 illustrates a storage network environment in which the invention can be implemented.

References in this specification to "an embodiment", "one embodiment", or the like, mean that the particular feature, structure or characteristic being described is included in at least one embodiment of the present invention. Occurrences of such phrases in this specification do not necessarily all refer to the same embodiment.

A network storage server with integrated encryption, compression and deduplication capability is described below, along with associated methods. The network storage server receives write requests from clients via a network and temporarily stores data blocks written by those requests in an internal buffer cache. At a "consistency point" event, the storage server commits the buffered data blocks to its persistent storage subsystem (PSS), which includes one or more nonvolatile mass storage devices. The storage server includes a storage operating system, which performs data management and services client-initiated data access requests (among other operations).

In certain embodiments, during the consistency point process the storage operating system compresses and encrypts the buffered data blocks and stores the compressed and encrypted data blocks in the PSS. In parallel with the compression and/or the encryption, data blocks are also processed through a hash function or other similar function to generate a unique "fingerprint" (value) for each data block. The fingerprint is subsequently used to identify and coalesce duplicate data blocks (a process called "deduplication"). Fingerprints can also be used for file signing as well as for conventional data integrity checks. The fingerprints themselves may also be digitally signed to prevent or detect tampering. The integration of fingerprinting, compression and encryption within the storage operating system, and particularly with the consistency point process, greatly facilitates and simplifies the co-implementation of these functions.

Further, the integration of all of these functions within a storage server alleviates the concern associated with a separate security appliance, that some clients may have a different, non-secure path to the data. Furthermore, such integration also facilitates coexistence with front-end caching devices. Specifically, with encryption/decryption integrated into a storage server, those functions become transparent to any caches in front of the storage server.

In certain embodiments, the decisions whether to encrypt write data from the client are made based on the actual content of the data or attributes of the data, rather than based on, for example, the destination (location) or context of the data. For example, in certain embodiments, write data are indexed and classified based on their content, to facilitate encryption decisions, prior to committing the data to nonvolatile mass storage (i.e., prior to the next consistency point) or during the next consistency point. In such embodiments, the data can be indexed and classified within the data path between the client interface and the storage interface in the storage server, i.e., "in-line".

In certain embodiments, other types of security related decisions can be made based on the content of the data. For example, in some cases a content based decision might be to enforce more stringent access control lists (ACLs) on an item of data, to audit access to it strictly, or simply to catalog the location of this item of data for later reporting to an appropriate administrator.

The basic functionality of the storage server includes maintaining logical containers of data (hereinafter simply "logical containers") at various different levels of granularity, such as volumes, directories and files. In accordance with a user's choices, encryption can be applied at any one or more of these levels of granularity, such as at the volume level, the directory or subdirectory level, and/or the file level. A separate, unique cryptographic key can be used for each encrypted logical container. Various other features and operations of the storage server are also described below.

Refer now to FIG. 1, which shows a network storage system in which the present invention can be implemented. In FIG. 1, a storage server 2 is coupled to a primary persistent storage (PPS) subsystem 4 and to a set of clients 1 through an interconnect 3. The interconnect 3 may be, for example, a local area network (LAN), wide area network (WAN), metropolitan area network (MAN), global area network such as the Internet, a Fibre Channel fabric, or any combination of such interconnects. Each of the clients 1 may be, for example, a conventional personal computer (PC), server-class computer, workstation, handheld computing/communication device, or the like.

Storage of data in the PPS subsystem 4 is managed by the storage server 2. The storage server 2 receives and responds to various read and write requests from the clients 1, directed to data stored in or to be stored in the storage subsystem 4. The PPS subsystem 4 includes a number of nonvolatile mass storage devices 5, which can be, for example, conventional magnetic or optical disks or tape drives; alternatively, they can be non-volatile solid-state memory, such as flash memory, or any combination of such devices. The mass storage devices 5 in PPS subsystem 4 can be organized as a Redundant Array of Inexpensive Disks (RAID), in which case the storage server 2 accesses the storage subsystem 4 using a conventional RAID algorithm for redundancy.

The storage server 2 may provide file-level data access services to clients, such as commonly done in a NAS environment, or block-level data access services such as commonly done in a SAN environment, or it may be capable of providing both file-level and block-level data access services to clients. Further, although the storage server 2 is illustrated as a single unit in FIG. 1, it can have a distributed architecture. For example, the storage server 2 can be designed as a physically separate network module (e.g., "N-blade") and disk module (e.g., "D-blade") (not shown), which communicate with each other over a physical interconnect. Such an architecture allows convenient scaling, such as by deploying two or more N-modules and D-modules, all capable of communicating with each other through the interconnect.

Also coupled to the storage server 2 through the interconnect 3 is a management station 7. The management station 7 is a computer or other processing system which includes management application software that is used by a network administrator to configure the storage server 2, to provision storage in the PPS subsystem for, and carry out other management functions related to the storage network, such as scheduling backups, setting user access rights, etc.

Figure 2:
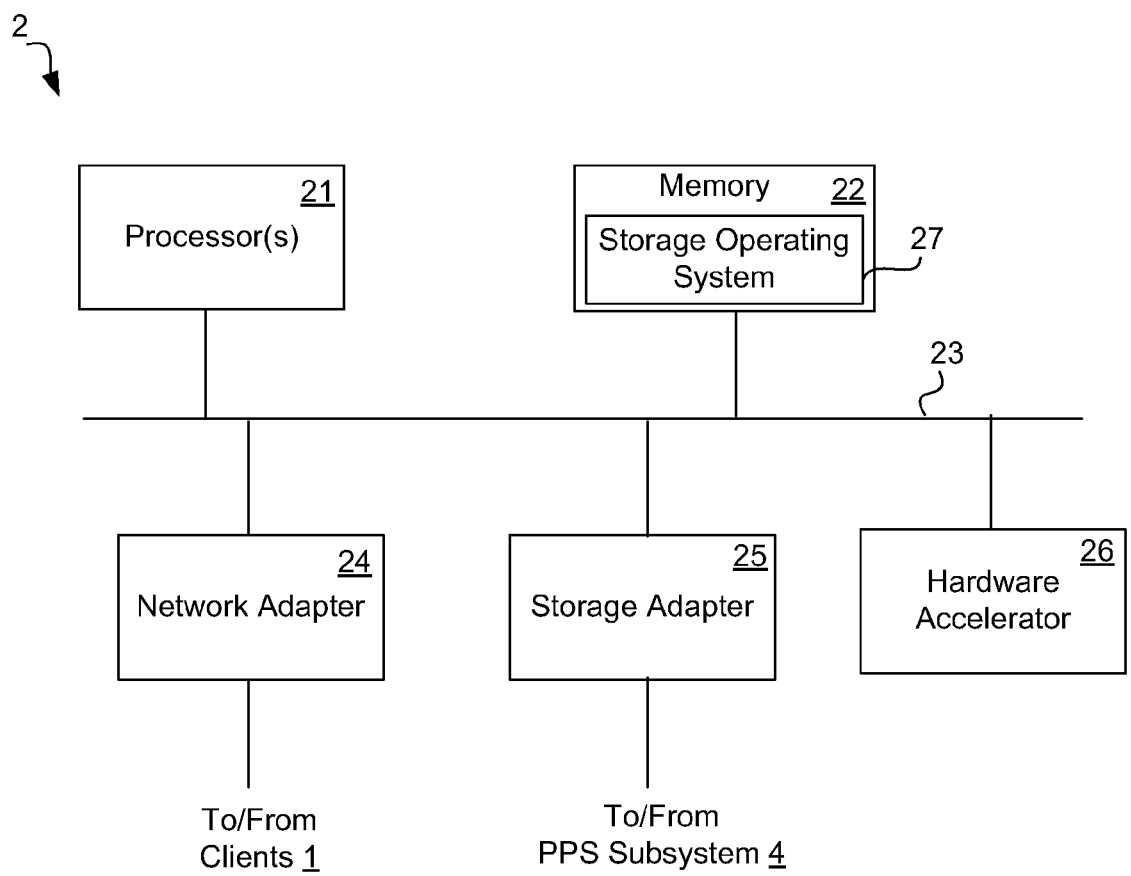
FIG. 2 is a high-level block diagram showing an example of the architecture of the storage server.

FIG. 2 is a high-level block diagram showing an example of the architecture of the storage server 2. The storage server 2 includes one or more processors 21 and memory 22 coupled to an interconnect 23. The interconnect 23 shown in FIG. 2 is an abstraction that represents any one or more separate physical buses, point-to-point connections, or both connected by appropriate bridges, adapters, or controllers. The interconnect 23, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The processor(s) 21 may include central processing units (CPUs) of the storage server 2 and, thus, control the overall operation of the storage server 2. In certain embodiments, the processor(s) 21 accomplish this by executing software or firmware stored in memory 22. The processor(s) 21 may be, or may include, one or more programmable general-purpose or special-purpose microprocessors, digital signal processors (DSPs), programmable controllers, application specific integrated circuits (ASICs), programmable logic devices (PLDs), trusted platform modules (TPMs), or the like, or a combination of such devices.

The memory 22 is or includes the main memory of the storage server 2. The memory 22 represents any form of random access memory (RAM), read-only memory (ROM), flash memory, or the like, or a combination of such devices. In use, the memory 22 may contain, among other things, at least a portion of the storage operating system 27 of the storage server 2.

Also connected to the processor(s) 21 through the interconnect 23 are a network adapter 24 and a storage adapter 25. The network adapter 24 provides the storage server 2 with the ability to communicate with remote devices, such as clients 1, over the interconnect 3 and may be, for example, an Ethernet adapter or Fibre Channel adapter. The storage adapter 25 allows the storage server 2 to access the PPS subsystem 4 and may be, for example, a Fibre Channel adapter or SCSI adapter.

In some embodiments, functions such as data indexing and classification, compression, encryption/decryption and deduplication are performed in software, such as by the storage operating system 27. In other embodiments, however, the storage server 2 includes a dedicated hardware accelerator 26 coupled to the interconnect 53, as shown, which performs any one or more of those functions. A hardware accelerator based implementation can be advantageous in that a dedicated hardware accelerator may be able to perform these functions faster than if they were performed in software. A hardware accelerator based implementation also has the advantage of obtaining good quality keys from a secure random number generator not available to software. The hardware engine 26 may be embodied as, for example, a dedicated circuit card or circuit module.

Figure 3:
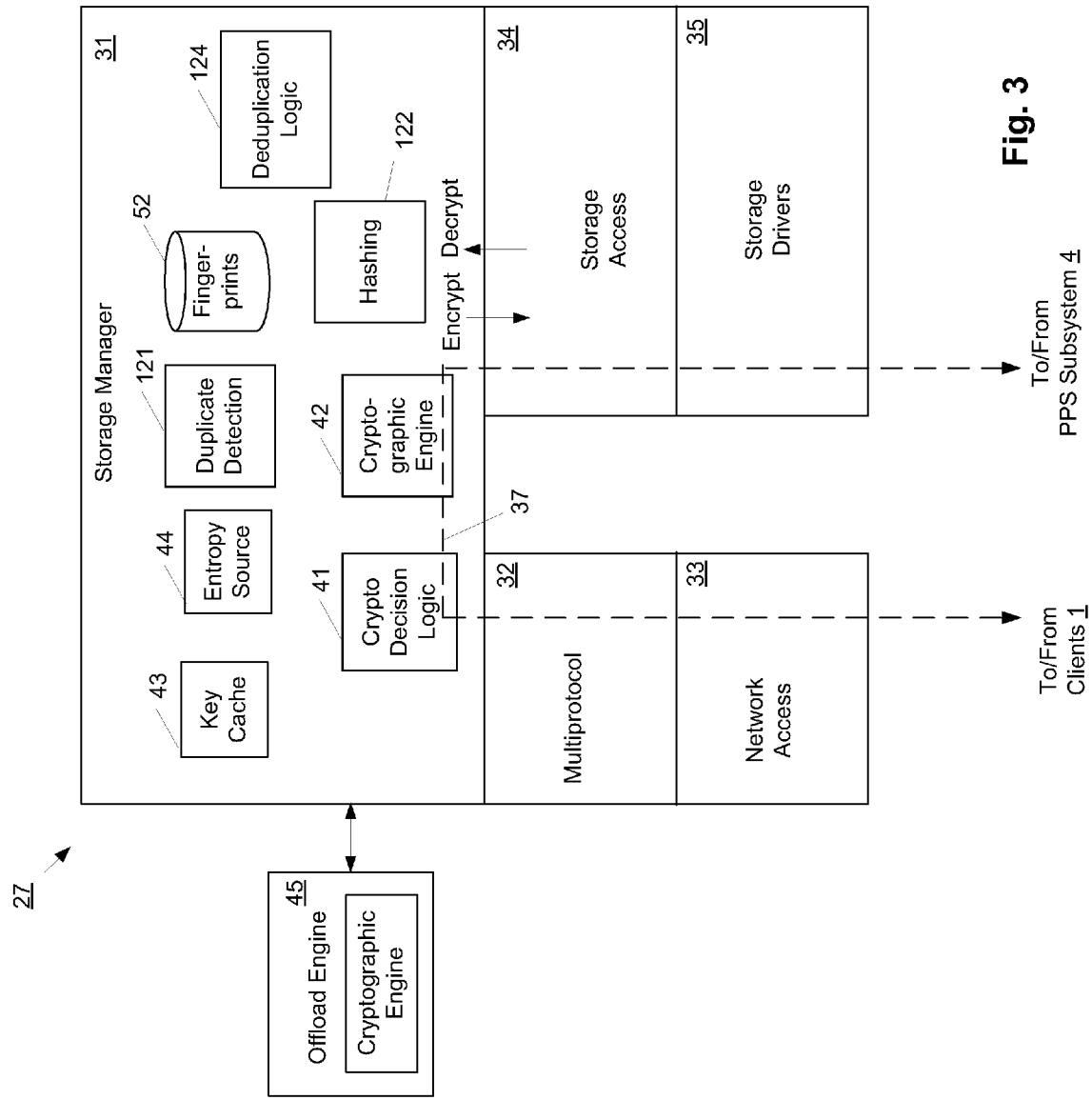
FIG. 3 schematically illustrates an example of a storage operating system that can be implemented in a storage server.

FIG. 3 schematically illustrates an example of the architecture of the storage operating system 27 in the storage server 2. In the illustrated embodiment, the storage operating system 27 includes several software modules, or "layers". These layers include a storage manager 31, which is the core functional element of the storage operating system 27. The storage manager 31 is application-layer software which imposes a structure (e.g., a hierarchy) on the data stored in the PPS subsystem 4 and which services read and write requests from clients 1. To improve performance, the storage manager 31 accumulates batches of writes in a buffer cache 6 of the storage server 6 and then streams them to the PPS subsystem 4 as large, sequential writes. In certain embodiments, the storage manager 21 implements a journaling file system and implements a "write out-of-place" (also called "write anywhere") policy when writing data to the PPS subsystem 4. In other words, whenever a logical data block is modified, that logical data block, as modified, is written to a new physical storage location (physical block), rather than overwriting the data block in place.

Logically "under" the storage manager 31, to allow the storage server 2 to communicate over the network 3 (e.g., with clients 1), the storage operating system 27 also includes a multiprotocol layer 32 and a network access layer 33. The multiprotocol 32 layer implements various higher-level network protocols, such as Network File System (NFS), Common Internet File System (CIFS), Hypertext Transfer Protocol (HTTP), Internet small computer system interface (iSCSI), and/or backup/mirroring protocols. The network access layer 33 includes one or more network drivers that implement one or more lower-level protocols to communicate over the network, such as Ethernet, Internet Protocol (IP), Transport Control Protocol/Internet Protocol (TCP/IP), Fibre Channel Protocol (FCP) and/or User Datagram Protocol/Internet Protocol (UDP/IP).

Also logically under the storage manager 31, to allow the storage server 2 to communicate with the persistent storage subsystem 4, the storage operating system 27 includes a storage access layer 34 and an associated storage driver layer 35. The storage access layer 34 implements a higher-level disk storage protocol, such as RAID-4, RAID-5 or RAID-DP, while the storage driver layer 35 implements a lower-level storage device access protocol, such as Fibre Channel Protocol (FCP) or small computer system interface (SCSI).

Also shown in FIG. 3 is the path 37 of data flow through the storage operating system 27, associated with a read or write operation, from the client interface to the PPS interface. Thus, the storage manager 31 accesses the PPS subsystem 4 through the storage access layer 34 and the storage driver layer 35.

In certain embodiments, the storage operating system 27 has a distributed architecture. For example, the multiprotocol layer 32 and a network access layer 33 can be contained in an N-module (e.g., N-module) while the storage manager 31, storage access layer 34 and storage driver layer 35 are contained in a separate D-module (e.g., D-blade), and the N-module and D-module communicate with each other (and, possibly, other N- and D-modules) through some form of physical interconnect.

In some embodiments, as illustrated, the storage manager 31 includes crypto decision logic 41, a cryptographic engine 42, an entropy source 43 and a key cache 44. The cryptographic engine 42 performs encryption and decryption of data blocks. The crypto decision logic 41 intercepts data blocks in the data path 37, determines whether encryption or decryption is required, and routes the data blocks to the cryptographic engine 42 when encryption or decryption is required.

In the illustrated embodiment the storage manager 31 further includes duplicate detection logic 121, hashing (fingerprinting) logic 122, a fingerprints database 52, and deduplication logic 124. As described for the below, the hashing logic 122 generates a fingerprint for each data block being written (or to be written) by the storage manager 31 and stores the fingerprints in the fingerprints database 52. The duplicate detection logic 121 detects duplicate data blocks based on the fingerprints stored in the fingerprints database 52. The deduplication logic 124 eliminates duplicate data blocks by coalescing duplicate data blocks, i.e., by implementing sharing of data blocks.

In certain embodiments, the crypto decision logic 41 performs data indexing and classification, to index and classify write data received from clients, for possible encryption and/or for other security modifications (e.g., more restrictive access permissions or auditing requirements), based on the actual content of the data (as opposed to the destination or context of the data, for example). For example, the crypto decision logic 41 can recognize and index various different types of sensitive data, such as social security numbers, birth dates, credit card numbers, and other distinct types of sensitive data, and differentiate them from non-sensitive data, and classify data items accordingly.

Content based indexing and classification offers several advantages: It does not require any a priori identification of directories, shares or disks where confidential data might be written in the future. Therefore, it minimizes the chances of missing confidential data, and at the same time limits the total amount of data that needs to be encrypted, therefore reducing negative performance impact. Finally, by tying the appropriate encryption key to the exact information content in a specific data set, this approach allows the correct access control enforcement policy to be matched to each data set being protected. For example, if a company policy is to secure access to insurance records and to retain these records for 5 years, then all files containing customer insurance information would first be classified as 'insurance records' and then be automatically encrypted with keys that expire after 5 years.

Further, the classification and indexing can be performed in the data path 37 (i.e., "in line"), as shown in FIG. 3, prior to committing the files to persistent storage in PPS subsystem 4. By performing these functions within the storage server (such as in the data path 37), the system scales well while facilitating enforcement of access controls within the data path for optimal performance. Alternatively, indexing and classification can be performed as a background operation ("offline") rather than in line. While for encryption decisions in line may be the best approach, for other decisions, such as changing access permissions or changing audit requirements, an offline/background approach can be feasible as well.

As noted above, any or all of the above described security related functions (e.g., classification in indexing, compression, encryption/decryption) may be performed by a dedicated hardware accelerator (e.g., hardware accelerator 26 in FIG. 2). In such embodiments, data indexing and classification can still be performed in line before committing the data to the PPS subsystem 4. For example, the hardware accelerator 26 can receive data blocks from the storage manager 31, index and classify the data blocks based on pre-defined algorithms, and then either encrypt the data blocks or pass them back to the storage manager 31 unencrypted, depending on the results of the indexing and classification.

In another embodiment, at least some of the functionality mentioned above, such as the functionality of the cryptographic engine 42, may be implemented in a separate module, such as offload engine 45, which can be software and which is physically and/or logically separate from the storage operating system 27. One advantage of such an architecture is that it relieves the storage operating system 27 of having to perform certain computationally intensive tasks, such as encryption/decryption, which may increasing throughput in servicing client requests. The offload engine 45 can (but does not necessarily) reside in a separate hardware platform from the storage server 2.

Referring still to FIG. 3, the key cache 43 is directly accessible by the management station 7 and contains the cryptographic key material needed to boot storage server 2 and start providing encryption services. In some embodiments, the key cache 43 stores cryptographic keys used to encrypt and decrypt logical containers such as volumes, directories and files and provides keys to the cryptographic engine 42 on demand or preloaded at boot. The entropy source 44 is used to generate new cryptographic keys for the system in a random or pseudorandom manner.

The storage operating system 27 can communicate directly with an external data management policy enforcement engine 46, which can reside and execute in the management station 7 (FIG. 1). Communication between the operating system 27 and the data management policy enforcement 46 may be carried out using any conventional or convenient protocol. In one embodiment, the Zephyr API (ZAPI) interface from NetApp, Inc. is used for this purpose. Two types of management functionality are performed from the management station 7: configuration management and key management. Configuration management includes configuring storage areas for encryption e.g., associating encryption policies with logical containers, associating encryption or other security settings with content based rules, initiating encryption; unconfiguring encryption, e.g., disassociating encryption policies from logical containers, initiating decryption; and initiating rekeying of encrypted logical containers. Key management includes reporting a new key that needs to be stored persistently separate from the data, and requesting a key based on metadata that was read (for example after a reboot when trying to serve read-only data from a mirror image).

In the description above, the encryption/decryption functionality is implemented within the storage manager 31 or a separate offload engine 45. In other embodiments, however, that functionality is implemented within a different layer or module, such as in the multiprotocol layer 32 or in the storage access layer 33.

During normal operation of the storage server 2, the storage server 2 receives various read and write requests from clients 1. The write requests may be directed to data already stored in the PPS subsystem 4, or they may provide new data to be stored. Each write request is for writing one or more data blocks. A "data block" is the smallest unit of storage that can be independently managed by the storage manager 21. In one embodiment, each data block is 4 kB in length (contiguous), although other sized data blocks can be used.

The data blocks that are modified by write requests are initially buffered in RAM within the storage server 2; they are not immediately written to the PPS of subsystem 4 but are journaled into a separate non-volatile RAM (NVRAM). The (volatile) RAM which is used to buffer the write requests is called the "buffer cache" 6 (see FIG. 1). The purpose of this buffering is to reduce latency, since the physical storage devices that implement the PPS subsystem 4 typically have much higher access latency than RAM. Blocks that have been written to the buffer cache 6 but not yet written to the PPS subsystem 4 are referred to as "dirty" blocks.

The event at which dirty blocks are written to the PPS subsystem 4 is called a "consistency point". A consistency point is a recurring event, which may occur periodically, at scheduled times, or in response to a predetermined condition being met (e.g., the NVRAM journal being filled to a predetermined fraction of its capacity).

Figure 4:
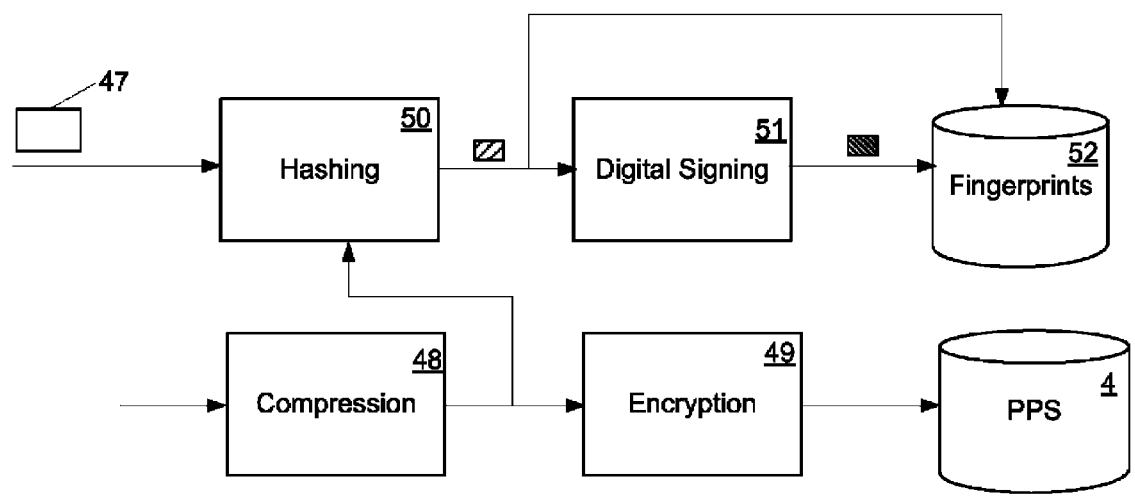
FIG. 4 shows an example of the data flow associated with processing a data block to be written in a storage server.

Encryption, compression and other functions can be combined together in the storage server 2 in a pipelined mode of operation. Referring now to FIG. 4, when the storage server 2 receives a request to write one or more data blocks 47 from a client, the encryption decision logic will determine whether each block is to be encrypted. If a block 47 is to be encrypted, it is tagged as such in its associated metadata. When the next consistency point occurs, that block (along with other "dirty" blocks) is first compressed by a compression function 48 and then encrypted by an encryption function 49, and then written to the PPS subsystem 4 in encrypted compressed form.

In parallel with the compression and encryption, the original data block 47 is processed by a hash function 50 or other similar function, to generate a unique fingerprint of (value representing) the data block, for use in subsequent duplicate block detection. In addition, or as an alternative, the fingerprint can be generated based on the compressed version of the data block 47 (i.e., based on the output of the compression function 48). Using fingerprints of uncompressed blocks for duplicate detection gives a greater probability of actually detecting duplicate data in typical data sets. On the other hand, using fingerprints of compressed blocks for duplicate detection allows the fingerprint database to be smaller and potentially allows greater storage space savings from deduplication (e.g., when exact matches of entire compression groups are detected). In some embodiments, a fingerprint may be generated of both the compressed and uncompressed version of a data block.

In one embodiment, SHA-256 or SHA-512 is used to generate the fingerprint. Optionally, the fingerprint is then digitally signed by a signature function 51. The fingerprint (or signed fingerprint) is then stored in any convenient storage facility 52 for future use in deduplication. Deduplication can be performed at any convenient time and is not necessarily temporally linked to a consistency point or to any of the aforementioned functions. For example, deduplication can be performed as a background function, such as during idle time of the processor(s) in the storage server. In one embodiment, each of functions 48, 49, 50 and 51 is implemented by the storage manager 31 of the storage operating system 27.

Figure 5:
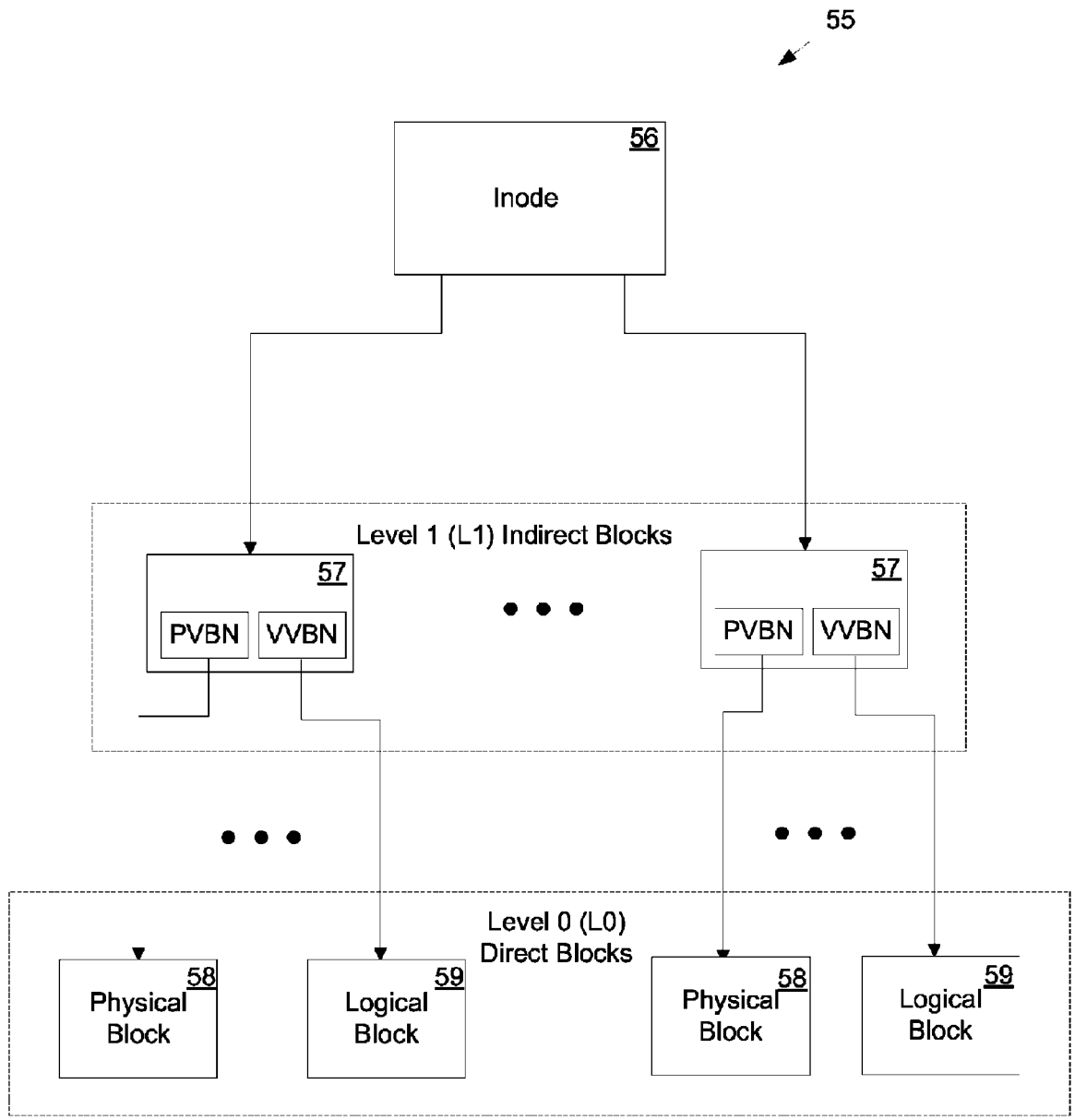
FIG. 5 illustrates an example of a buffer tree of a file.
Figure 6:
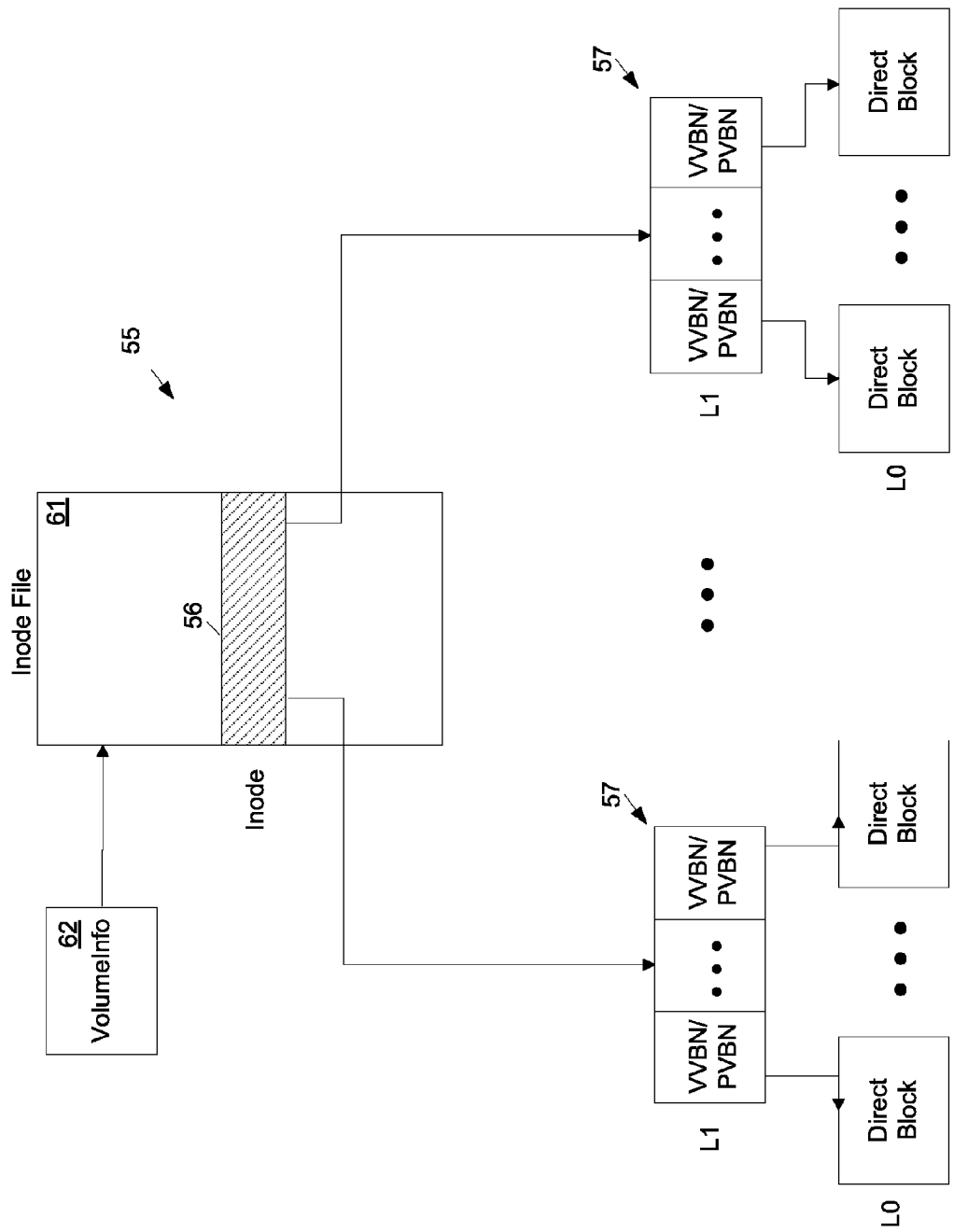
FIG. 6 shows an example of the relationship between a VolumeInfo block, an inode, an inode file and a buffer tree in a storage server.

Before considering these processes further, it is useful to consider how data storage can be structured by the storage server 2. Reference is therefore made to FIGS. 5 and 6 in this regard.

In at least one embodiment, data is stored by the storage server 2 in the form of logical containers such as volumes, directories and files. The term "aggregate" is used to refer to a pool of storage, which combines one or more physical mass storage devices (e.g., disks) or parts thereof into a single logical storage object. The aggregate contains or provides storage for one or more other logical data sets at a higher level of abstraction, such as volumes. A "volume" is a set of stored data associated with a collection of mass storage devices, such as disks, which obtains its storage from (i.e., is contained within) an aggregate, and which is managed as an independent administrative unit, such as a complete file system. Each volume can contain data in the form of one or more files, directories, subdirectories, LUNs or other types of logical containers.

In certain embodiments, an aggregate uses a physical volume block number (PVBN) space that defines the storage space of blocks provided by the storage devices of the physical volume, and each volume within a file uses a "logical" or "virtual" volume block number (WBN) space in order to organize those blocks as files. A PVBN, therefore, is an address of a physical block in the aggregate. A VVBN is an address of a block in a volume (the same block as referenced by the corresponding PVBN), i.e., the offset of the block within the file that represents the volume. Each block within a file also has a file block number (FBN), which represents the logical position of the block within that file. Knowledge of all of the VVBNs, PVBNs and FBNs is maintained by the storage manager 21. Each VVBN space is an independent set of values that corresponds to locations within a file, which are translated by the storage access layer 34 to device block numbers (DBNs) on a physical storage device.

Each volume can be a separate file system that is "mingled" onto a common set of storage in the aggregate by the storage operating system. The storage access layer 34 of the storage operating system 27 builds a RAID topology structure for the aggregate that guides each volume when performing write allocation. The storage access layer 34 also presents a PVBN-to-DBN mapping to the storage manager 31.

Each file managed by the storage server 2 is represented internally as a hierarchical structure called a "buffer tree". A buffer tree is a hierarchical structure which used to store file data as well as metadata about a file, including pointers for use in locating the data blocks for the file. A buffer tree includes one or more levels of indirect blocks (called "L1 blocks", "L2 blocks", etc.), each of which contains one or more pointers to lower-level indirect blocks and/or to the direct blocks (called "L0 blocks") of the file. All of the logical data in the file is stored only at the lowest level (L0) blocks.

The root of a buffer tree is the "inode" of the file. An inode is a metadata container which used to store metadata about the file, such as ownership, access permissions, file size, file type, and pointers to the highest level of indirect blocks for the file. Each file has its own inode. The inode is stored in a separate inode file, which may itself be structured as a buffer tree.

FIG. 5 shows an example of a buffer tree 55 for a file. The file 55 is assigned an inode 56, which references Level 1 (L1) indirect blocks 57. Each indirect block 57 stores at least one PVBN and a corresponding VVBN for each PVBN. To simplify description, only one PVBN-WBN pair is shown in each indirect block 57 in FIG. 2; however, an actual implementation could include many PVBN-VVBN pairs in each indirect block. Each PVBN references a physical block 58 in a storage device and the corresponding VVBN references the associated logical block number 59 in the volume. The inode 56 and indirect blocks 57 are each shown pointing to only two lower-level blocks 58 or 59 to simplify description. It is to be understood, however, that an inode and any indirect block can actually include a greater number of pointers and thus may refer to a greater number of lower-level blocks.

Referring now to FIG. 6, for each volume managed by the storage server 2, the inodes of the files and directories in that volume are stored in a separate inode file 61. A separate inode file 61 is maintained for each volume. Each inode 56 in an inode file 61 is the root of the buffer tree 55 of a corresponding file or directory. The location of the inode file 61 for each volume is stored in a Volume Information ("VolumeInfo") block 62 associated with that volume. The VolumeInfo block 62 is a metadata container that contains metadata that applies to the volume as a whole. Examples of such metadata include, for example, the volume's name, type, size, any space guarantees to apply to the volume, the VVBN of the inode file of the volume, and information used for encryption and decryption, as discussed further below.

In one embodiment, AES256 encryption is used to encrypt data in the storage server 2, although essentially any other encryption algorithm could instead be used. Further, in one embodiment the encryption block size is 16 bytes in length, and the encryption operation for each 16 bytes is done per the IEEE P1619 disk encryption standard, as follows:

CT=AES256_Encrypt_with_K1(PT×(K2*EBN)) where:
CT is the output ciphertext (128 bits);
PT is the input plain text (128 bits);
K1 is the main encryption key (256 bits);
K2 is the Tweak encryption key (128 bits);
x is the XOR operation (128 bits);
* is the Galois field multiply modulo an irreducible polynomial in GF(2^128); and
EBN is an "encryption block index" parameter taken from the storage environment.

The parameters K1 and K2 are together referred to as the cryptographic key or encryption key. They are always paired and can be treated as a single object with a unique key ID, which in the case of a volume key, can be stored in the VolumeInfo block for the volume.

The purpose of the EBN parameter is to make identical plain text blocks stored in different locations on disk look completely different after encryption. The EBN allows random access to any block on disk since no chaining is done. In one embodiment, for any given data block, the VVBN of the block represents the EBN parameter in the encryption function. Using the VVBN as the EBN parameter has advantages over using, for example, the PVBN or FBN. Specifically, since two or more identical data blocks can be assigned different FBNs within different files or within the same file, use of the FBNs for encryption would preclude or significantly hinder deduplication. The use of VVBN also allows features such as mirroring software to preserve the fingerprint database as well as deduplication and compression space savings across mirrors. Nonetheless, other parameters could potentially be used as the EBN, including the FBN or PVBN of a block.

In one embodiment, the storage operating system 27 maintains a separate cryptographic key for each volume. The cryptographic key for a volume is used to encrypt and decrypt all logical containers (e.g., directories, subdirectories, files, LUNs) contained within that volume. The cryptographic key for a volume can be stored in the volume's VolumeInfo block 62, for example, along with other metadata, such as encryption policy information (e.g., whether or under which circumstances the volumes contents should be encrypted), compression algorithm, etc.

Encryption can be applied to one or more levels of the buffer tree for any given logical container to be encrypted, according to a user's (e.g., network administrator's) preference. The selection of how many levels are to be encrypted can be implemented as a configurable parameter of the storage operating system 27. Such parameter can be set by the network administrator during initial network set up, or dynamically during runtime.

In general, the choice of how many levels of the buffer tree to encrypt is a trade-off between security and consumption of processing resources: Encrypting more levels provides greater security but consumes more processing resources, and vice versa. For example, encryption might be applied only at the direct block (L0) level, to provide some security while minimizing consumption of processing resources by the security functions. Alternatively, encryption can be applied at the direct block level and one or more, but not all, levels of indirect blocks, for greater security, but at the cost of greater consumption of processing resources.

As yet another alternative, for greatest security, encryption can be applied at all levels of blocks in the buffer tree. This optimization can provide a distinct security advantage over a standalone external encryption appliance. For example, the indirect blocks in a buffer tree can encode information about unused space, i.e. "holes" or "zeroes", in files. Specifically, in an embodiment where each block is 4 Kbytes, a "0" value of a PVBN/VVBN in an L1 indirect block can encode 4 Kbytes worth of zero data in the L0 block. Similarly, a "0" value of PVBN/VVBN in an L2 indirect block in such an embodiment can encode about 2 Mbytes of contiguous zero data at the L0 level. For an external security appliance to achieve the same level of security, it would have to actually encrypt these large chunks of zeroes. Furthermore, encrypting these zeroes externally would destroy any space savings achieved by this intelligent encoding of holes in the file system indirect blocks. In contrast, performing the encryption inside the storage server provides security for holes while retaining their space savings.

The trade-off associated with how many levels of the buffer tree to encrypt can be particularly significant if the storage manager 21 implements a write out-of-place (or "write anywhere") policy when modifying data such as done by the WAFL file system from NetApp, Inc. In such a system, any time a data block is modified, it is stored to new physical location. Consequently, all of the indirect blocks that point to the modified block, either directly or indirectly, must also be read, modified, and stored to a new location on disk. If encryption is applied at one or more levels above the direct blocks, this modification process also involves decrypting and re-encrypting all of those indirect blocks that point to the modified direct blocks, up to the highest level that is encrypted, which can have a significant impact on the system's performance. Nonetheless, such impact may be worthwhile in view of the added security provided.

In certain embodiments, all blocks are encrypted except directory blocks, which are left in plain text. This encryption scheme or any of those mentioned above may be selected as an administrative option.

Encryption can also be applied at different granularity levels of logical containers. For example, encryption can be applied only at the volume level, meaning that all encrypted contents of a given volume are encrypted using the same key, but each volume has a different key. This is referred to as volume level encryption. In addition, or as an alternative, encryption can be applied below the volume level, such as at the directory level, meaning that all encrypted contents of a particular directory are encrypted using the same key, but each directory has a different key (the same can be done with subdirectories). This is referred to as directory level encryption. In addition, or as an alternative, encryption can be applied at the file level, meaning that all encrypted contents within a given file are encrypted using the same key, but each file has a different key. This is referred to as file level encryption.

The selection of the level of granularity at which to encrypt any particular logical container can be implemented as a configurable parameter of the storage operating system 27. Such parameter can be set by the network administrator during initial network set up, or dynamically during runtime.

In one embodiment, to reduce the number of keys visible to administrators or external key management mechanisms, the cryptographic key of a logical container is encrypted using one or more higher-level keys. For example, a file level key is encrypted by using the directory key and/or the volume key of the directory and/or volume that contains the file, respectively, as well as with the root key of the storage server. These higher-level keys are referred to as wrapping keys, because in order to use the lowest level key (e.g., a file level key), it must be progressively "unwrapped" (decrypted) with the higher-level keys. Wrapping keys are only used to encrypt/decrypt other keys, not actual data.

Figure 7:
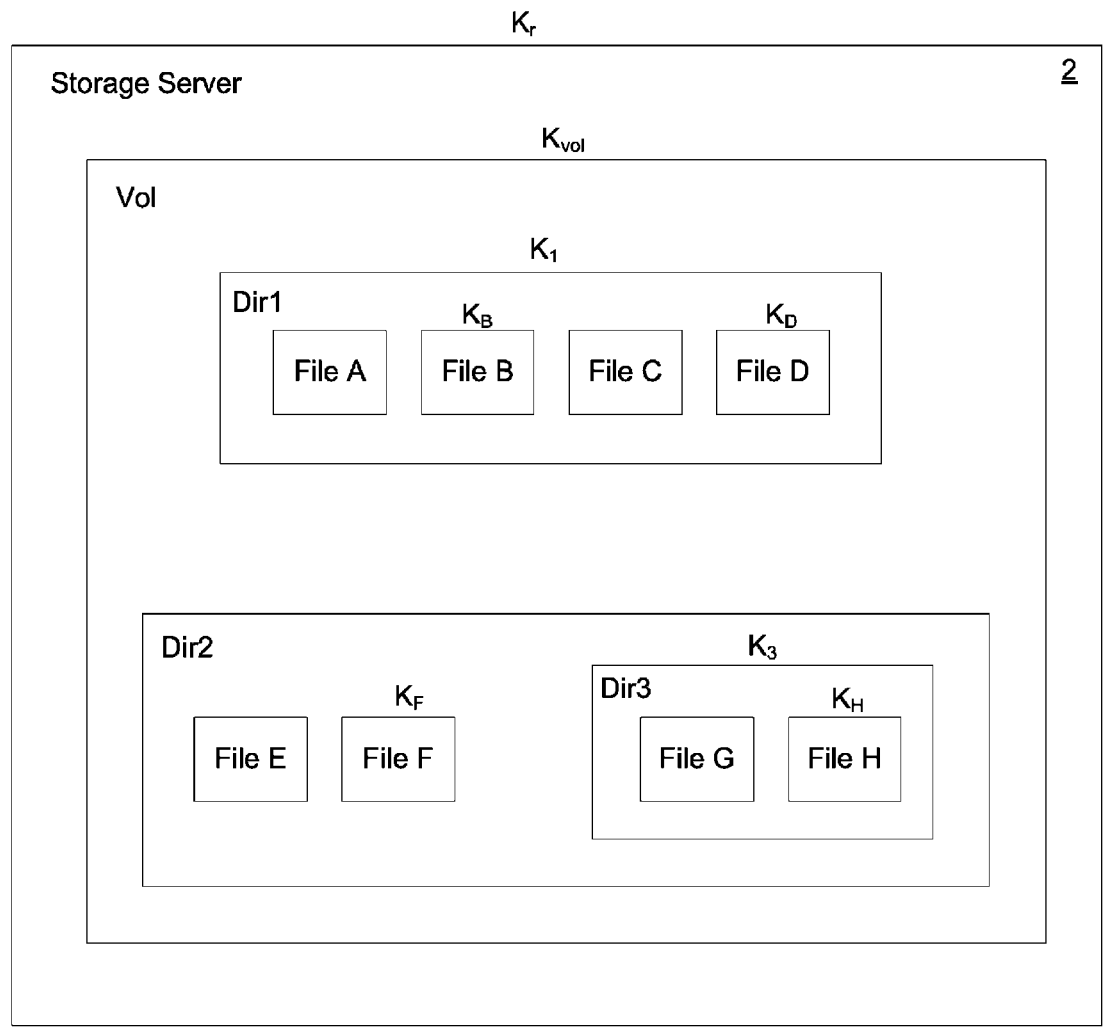
FIG. 7 illustrates an example of hierarchical encryption of logical containers and/or encryption keys.

Referring to FIG. 7, for example, a volume, Vol, contains two directories, Dir1 and Dir2. Dir1 contains four files, File A, File B, File C and File D. Dir2 contains two files, File E and File F, as well as a subdirectory, Dir3. Dir3 contains two files, File G and File H. In the illustrated example, File B is associated with a file level encryption key, $K_B$, and File D is associated with a separate file level encryption key, $K_D$. In Dir3, File H is associated with a separate file level encryption key, $K_H$. Also, in Dir2, File F is associated with a separate file level encryption key, $K_F$.

In the illustrated example, file keys $K_B$ and $K_D$ are encrypted using the directory level key $K_1$. Further, file key $K_H$ is encrypted using directory level key $K_3$ gated with Dir3. File key $K_F$ as well as already-encrypted keys $K_1(K_B)$, $K_1(K_D)$ and $K_3(K_H)$ are encrypted using volume encryption key $K_{vol}$. All of these encrypted keys and key combinations are further encrypted using a root key $K_r$ of the storage server. In this way, cryptographic keys can be hierarchically encrypted for added security.

A key hierarchy has at least two advantages. First, it reduces the number of keys that need to be stored and backed up securely. Second, it makes features such as mirroring and clustering easier to mange by sharing keys at the appropriate level in the hierarchy. For example, instead of transferring a key per file between cluster partners, the system can simply transfer the root key of the storage server to its cluster partner.

Different levels of encryption granularity can also be combined hierarchically to encrypt the actual data in a given logical container, for greater security. For example, contents of a volume can be encrypted at the file level, and then further encrypted at the directory level and/or volume level. Hence, the actual contents of a logical containers can be encrypted hierarchically in a similar manner as described above with reference to FIG. 7 regarding the encryption of keys. Note, however, that wrapping keys are only used to encrypt/decrypt other keys; separate keys are used to encrypt actual data.

Figure 8:
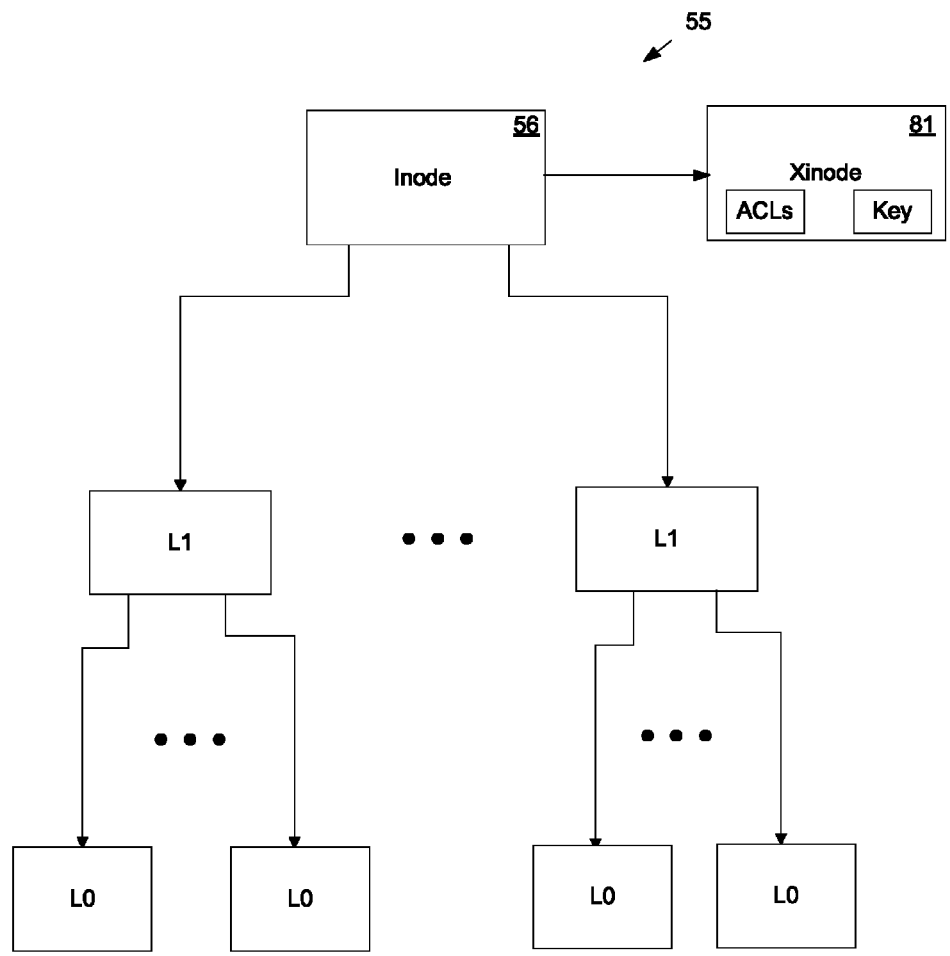
FIG. 8 illustrates an example of the relationship between the buffer tree of a logical container and its associated xinode.

In one embodiment, for each directory or file managed by the storage server 2, the storage manager 21 maintains a separate metadata container called an xinode, which is used to store security related information for that directory or file. In one embodiment, as shown in FIG. 8, the xinode 81 is pointed to by the inode 56 of the directory or file and contains access control lists (ACLs)(permissions) as well as any cryptographic key (or a pointer to it) that applies specifically to that directory or file. Note, however, that cryptographic keys, permissions and/or other security information can be stored in any other convenient location, i.e., not necessarily in xinodes.

A volume or other logical container may be assigned a new cryptographic key from time to time, to enhance security. The process of assigning a new key is called "rekeying". Rekeying may be done after every consistency point, for example. In one embodiment, the process of rekeying a volume proceeds from the first file in the volume to the last file in the volume in sequential (logical) order. The current progress of the rekeying operation ("rekey point") is recorded in the metadata associated with that volume, such as in the VolumeInfo block of the volume.

It may be necessary or at least desirable to retain old keys in order to be able to decrypt and read copies of data that were encrypted using the old keys, such as snapshots or backup copies. Also, in a write out-of-place file system, if only newly written data is rekeyed, it is necessary to retain the old keys to be able to decrypt and read the unmodified data. Therefore, a special file or other logical container (on or off the storage server) can be used for each volume to store the various keys used for that volume over time.

Figure 9A:
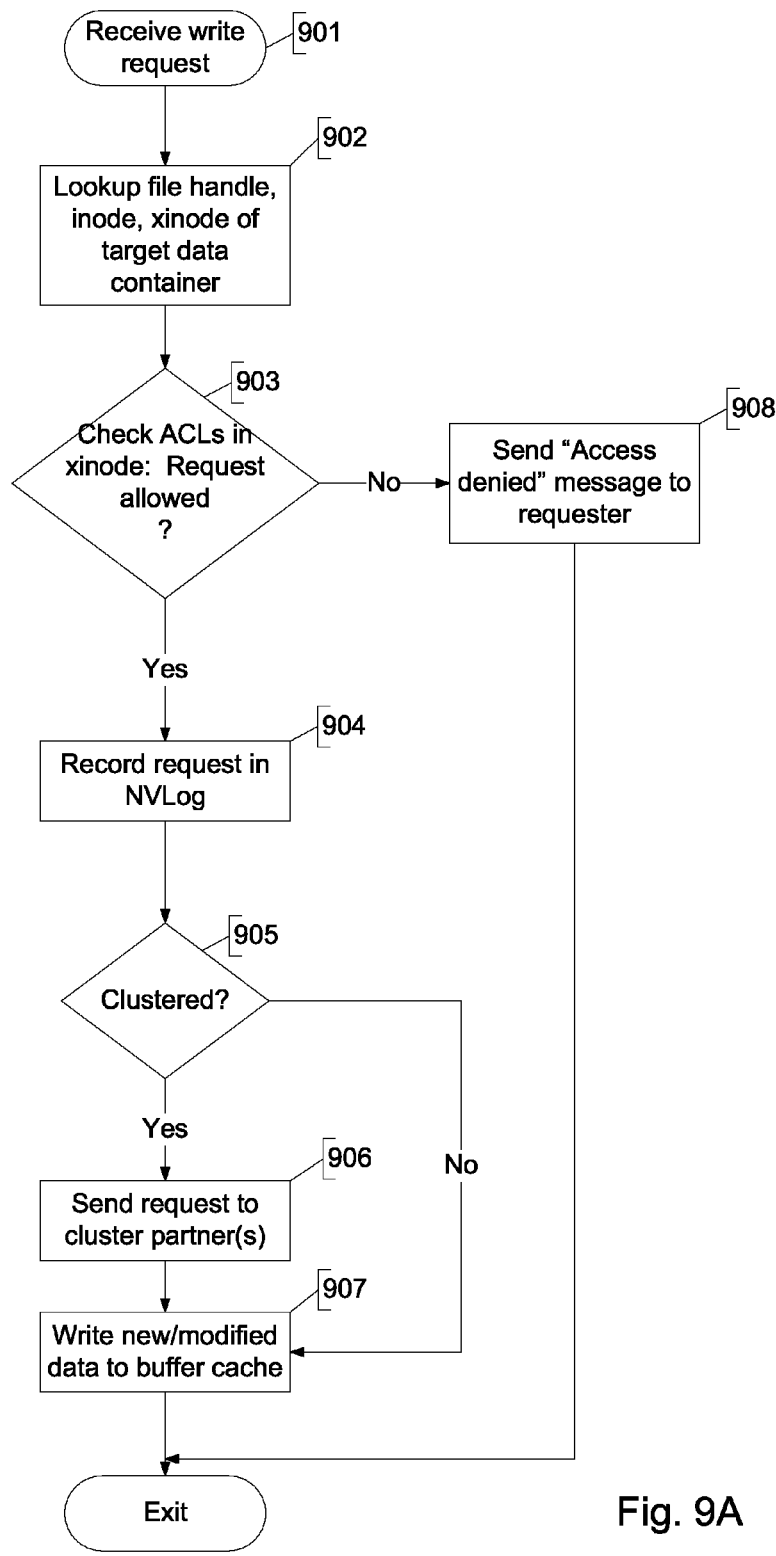
FIG. 9A is a flow diagram showing an example of the process of receiving and buffering write requests in a storage server.
Figure 9B:
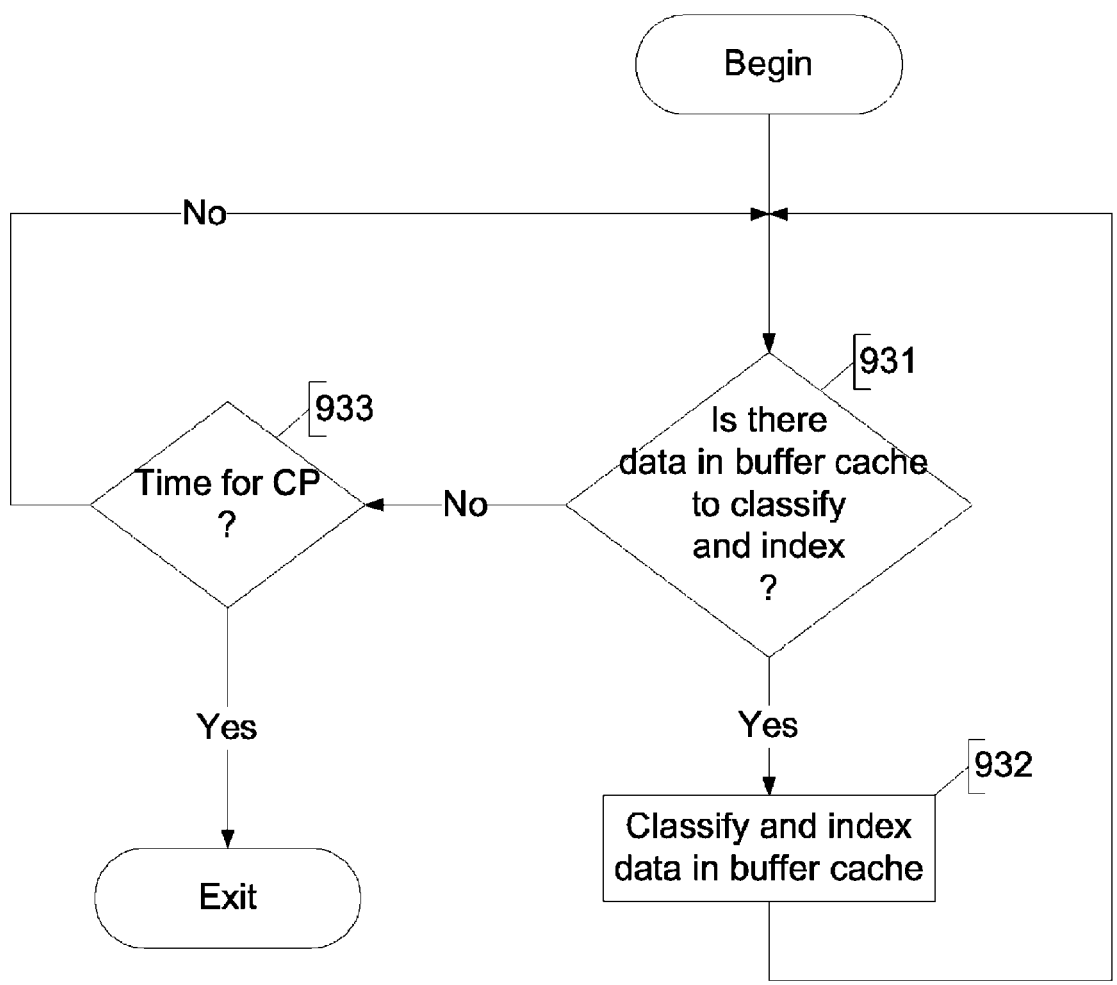
FIG. 9B is a flow diagram showing an example of the temporal relationship between data classification and indexing and a consistency point ("CP") process in a storage server.
Figure 9C:
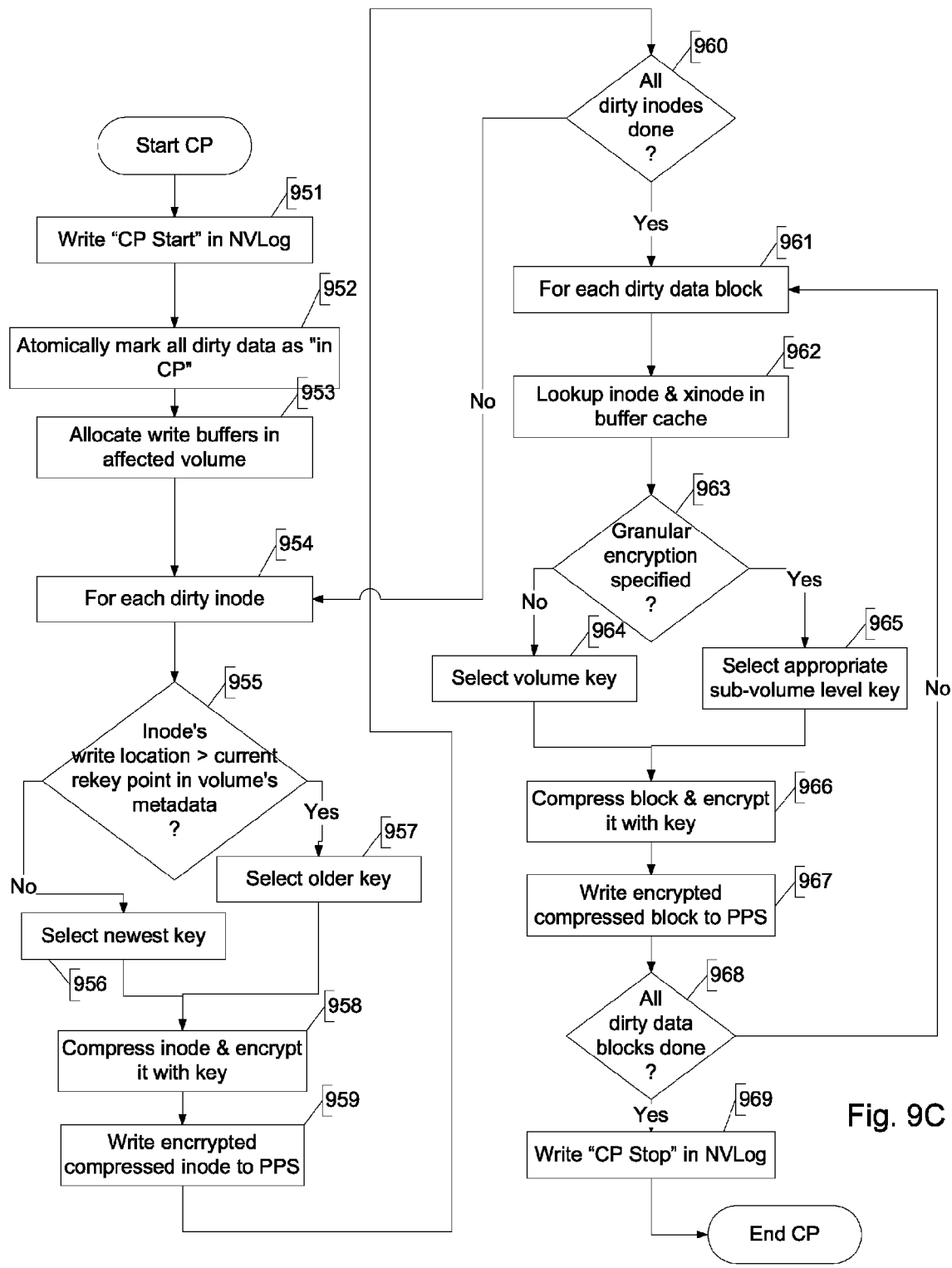
FIG. 9C is a flow diagram showing an example of the consistency point ("CP") process in a storage server.

FIGS. 9A, 9B and 9C collectively illustrate an example of the processes of handling a client-initiated write request in the storage server 2. In particular, FIG. 9A shows the process of receiving a write request and storing the write data in buffer cache 6. Initially, a write request is received by the storage server 2 from a client 1. It is assumed for purposes of explanation that the request is (or is similar in form to) an NFS write request, at least to the extent that it includes a volume identifier, file handle, starting block number, number of blocks to write and the data blocks to be written. In other embodiments, however, a write request may have a different format and/or conform to a different protocol.

The storage server initially receives a write request at 901. The process responds to the write request first by looking up the file handle, inode and xinode for the targeted file at 902 (starting from the VolumeInfo block identified by the volume identifier in the request). These lookup operations may involve reading and decrypting data from disk if the inode or xinode is not already in the buffer cache. The process then checks the ACLs in the xinode at 903 to determine whether to allow the write request. If the request is denied, an appropriate message to that effect is sent to the requesting client at 908, and the process ends.

If the request is allowed, it is recorded in the above-mentioned journal in NVRAM at 904. The journal, called "NVLog", is used as protection against a catastrophic failure of the storage server before the next consistency point. In the event of such a failure, the contents of the NVLog can be replayed to restore the state of the storage server's data at the time of failure. The NVLog is cleared at each consistency point.

Once the write request is recorded in NVLog, if the storage server 2 is operating as part of a storage cluster (905), the request or the NVLog entry is then forwarded to the other storage server(s) in the cluster at 906. Otherwise, this operation is bypassed. The process then writes the new or modified data into the buffer cache 6 at 907. The above process is repeated for each write request.

As noted above, in accordance with techniques introduced here, write data can be classified and indexed for possible encryption and/or other purposes in line, prior to committing the data to the PPS subsystem 4. FIG. 9B shows an example of the temporal relationship between data classification and indexing and a consistency point process in a storage server when data is classified and indexed in line. Note that data classification and indexing can execute in parallel with the process of FIG. 9A. At 931, the process determines whether there is data in the buffer cache 6 to classify an index. If the outcome of 931 is affirmative, the process classifies and indexes such data at 932, as described further below. For example, the process may classify any particular buffered file or set of blocks as "To be encrypted" or "Not to be encrypted" at 932. In the illustrated embodiment, the process then loops back to 931 and repeats 931 and 932 until there is no more data left in the buffer cache six to classify an index. When that is the case, the process determines whether it is time for the next consistency point (CP). If so, the process exits, but can resume after the next consistency point is completed. Otherwise, the process simply loops back to 931. In another embodiment, classifying and indexing data may continue independently of whether a consistency point process is executing.

Also, in other embodiments the operations of classifying and indexing data can be performed as a preliminary operations during the consistency point process, prior to committing the data to persistent storage. In still other embodiments, data may be classified in indexed even before being written to the buffer cache 6, e.g., as soon as the data is received from the client. And yet in other embodiments, data can be classified and indexed after being committed to the PPS subsystem 4, e.g., data is read from the PPS subsystem 4, then classified, indexed and encrypted as appropriate, and then written back to the PPS subsystem 4.

FIG. 9C illustrates an example of the consistency point ("CP") process. To simplify explanation, this example assumes that the CP is applied to only a single volume. It will be understood, however, that the same process can be applied to any number of volumes. Also, to simplify description it is assumed that all of the data operated upon in this process previously has been classified as "to be encrypted".

When a consistency point is triggered, the process initially writes a "CP Start" indication into the NVLog at 951. The process then at 952 atomically marks all dirty data as being "in CP" in some convenient metadata storage location. The process then allocates the appropriate number of write buffers in the affected volume at 953.

Next, a subprocess designated by reference numerals 954-960 is performed for each dirty inode. First, the process determines at 955 whether the inode's write location is greater than the current rekey point in the volume's metadata (if the volume is not in the process of being rekeyed, the current rekey point is the logical beginning point of the volume). If the inode's write location is greater than the current rekey point, the process selects the older (previous) key for the volume at 957. Otherwise, the process selects the newer key at 956. Once the key is selected, the inode is compressed and then encrypted at 958, using the selected key and the VVBN of the inode for the encryption. The encrypted compressed inode is then written to the PPS subsystem 4 at 959.

Next, a subprocess designated by reference numerals 961-968 is performed for each dirty data block. First, at 962 the process looks up in the buffer cache 6 the inode and xinode of the file that contains the block to be written. Note that the above-mentioned encryption of inodes is applied only to the copies of inodes that are being written to the PPS subsystem 4; the copies in the buffer cache 6 remain unencrypted. Among other information, the xinode indicates the selected granularity of encryption. For example, in the case of a file, the xinode of the file indicates whether a unique key is assigned to that particular file, as opposed to assigning a key only at the volume level.

If granular encryption has not been specified for the target volume (963), then at 964 the process selects the appropriate key for the volume that contains the block to be written. If, on the other hand, granular encryption has been specified (e.g., directory level or file level encryption), then at 965 the process selects the appropriate sub-volume level cryptographic key (e.g., directory key or file key) based on the logical offset of the block within the file. The process then compresses the data block and encrypts the compressed data block at 966, and writes it to the PPS subsystem 4 at 967. This subprocess repeats until all remaining dirty data has been processed and committed to the PPS subsystem 4 (968). The process then writes a "CP Stop" indication to the NVLog at 969 to indicate completion of the consistency point process.

Figure 10:
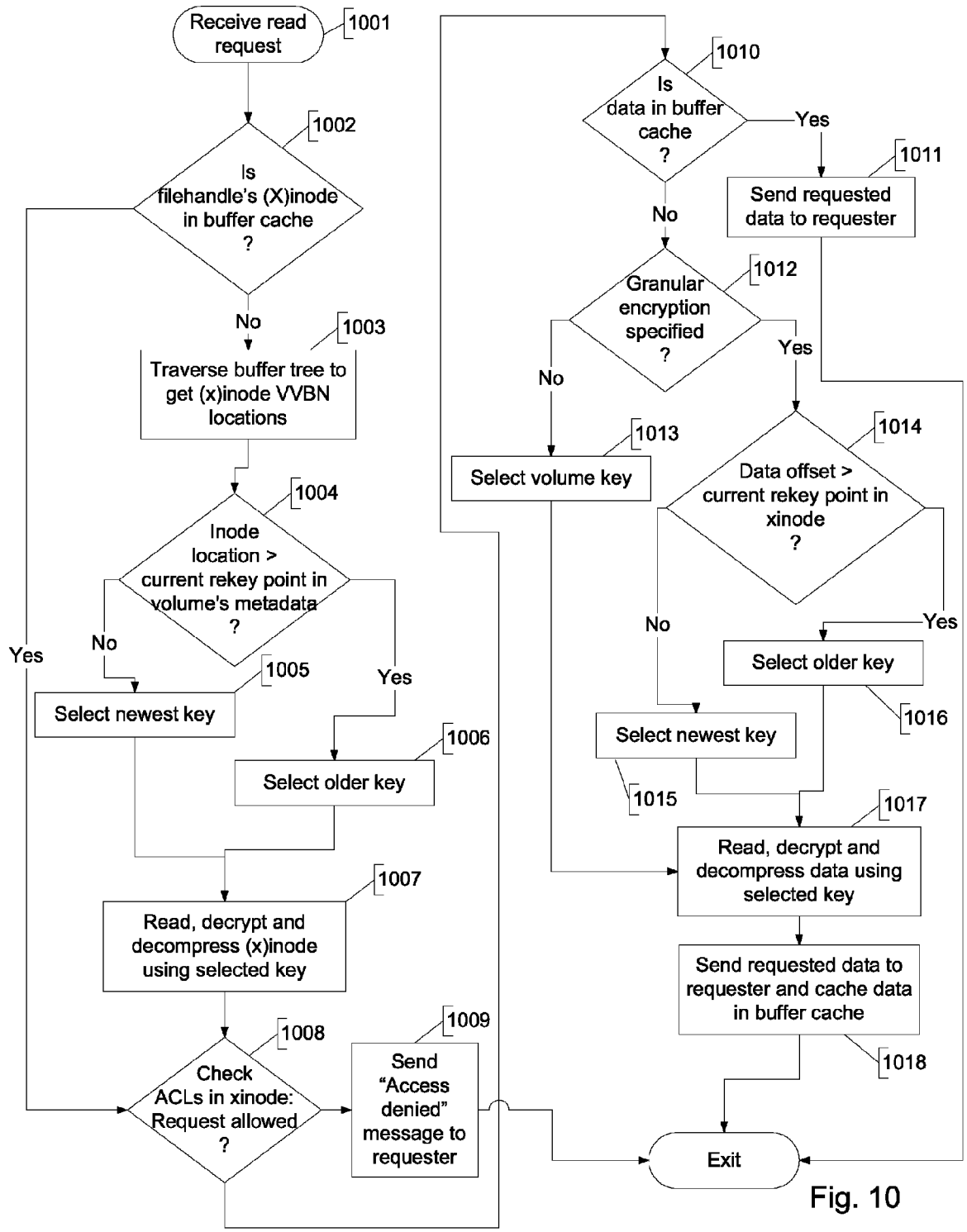
FIG. 10 is a flow diagram showing an example of the process of handling a read request in a storage server.

FIG. 10 illustrates an example of the process for handling a client read request in the storage server 2. It is assumed for purposes of explanation that the request is (or is similar in form to) an NFS read request, at least to the extent that it includes a volume identifier, file handle, starting block number and the number of blocks to be read. In other embodiments, however, a read request may have a different format and/or conform to a different protocol.

Initially, a read request is received by the storage server 2 from a client 1 at 1001. The process responds by determining at 1002 whether the file handle's inode and xinode are present in the buffer cache 6. If so, the process proceeds to 1008, discussed below. If not, the process traverses the buffer tree to get their VVBN locations at 1003. If the inode location is greater than the current rekey point indicated in the volume's metadata, the process selects the older cryptographic key for the volume at 1006; otherwise, the process selects the newer key at 1005. At 1007 the process then reads the inode and xinode from the PPS subsystem 4, decrypts them using the volume's key and the WBN, and then decompresses them.

Next, the process checks the ACLs in the xinode to determine whether access should be granted at 1008. If access is denied, an appropriate message is sent to the requesting client at 1009. If access is granted, the process proceeds to 1010 to determine whether the file data for the request is present in the buffer cache 6. If the data is present in the buffer cache 6, then the process simply retrieves the data from the buffer cache 6 and returns the data to the requesting client at 1011. If the data is not present in the buffer cache 6, the process determines from the inode (or xinode) at 1012 whether granular encryption applies to this file, i.e., whether a cryptographic key has been assigned uniquely to this particular file (i.e., file level encryption applies). If it is determined that file level encryption does not apply, then the process selects the volume key at 1013. At 1017 the process then reads, decrypts (using the selected key) and compresses the data, and then sends the data to the requesting client and to the buffer cache 6 at 1018.

If on the other hand it is determined at 1012 that granular encryption has been specified, then the process determines at 1014 whether the read data offset within the file is greater than the current rekey point indicated in the xinode. If so, then the process selects the older key at 1016 and then proceeds to read, decrypt and decompress the data at 1017 as described above. Otherwise, the process selects the newer key at 1015 and then proceeds to read, decrypt and decompress the data at 1017.

Figure 11A:
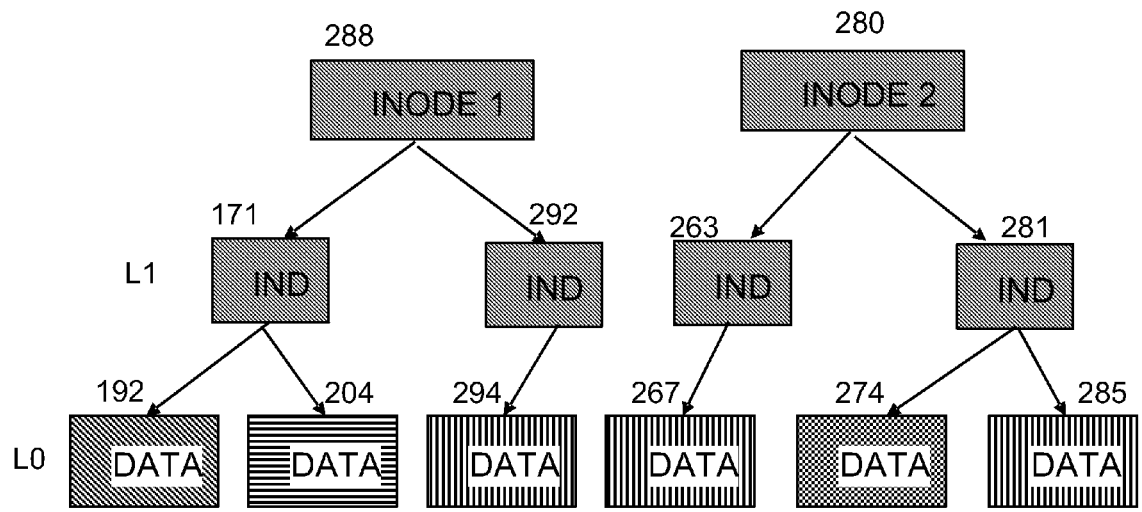
FIGS. 11A and 11B illustrate an example of two buffer trees before and after deduplication of data blocks, respectively.
Figure 11B:
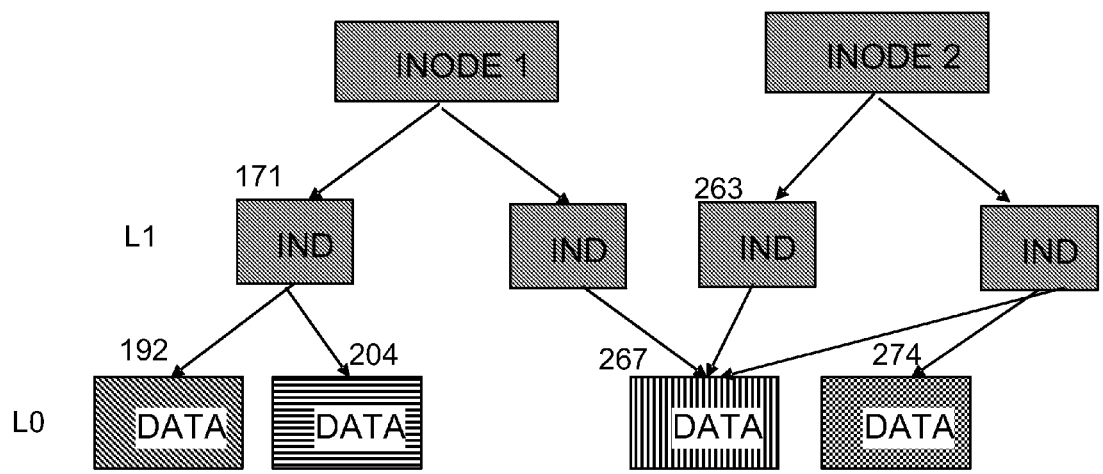

In certain embodiments, storage server 2 also performs deduplication of data blocks. To illustrate this functionality, FIGS. 11A and 11B show an example of the buffer trees of two files, where FIG. 11A shows the buffer trees before deduplication and FIG. 11B shows the buffer trees after deduplication. The root blocks of the two files are Inode 1 and Inode 2, respectively. The three-digit numerals in FIGS. 11A and 11B are the VVBNs of the various blocks. The fill patterns of the direct (L0) blocks in these two figures represents the data content of those blocks, such that blocks shown with identical fill pattern are identical data blocks. It can be seen from FIG. 11A, therefore, that the data blocks with WBNs 294, 267 and 285 are identical.

The result of deduplication is that these three data blocks are coalesced into a single data block, identified by VVBN 267, which is now shared by the indirect blocks that previously pointed to data block 294 and data block 285. Further, it can be seen that data block 267 is now shared by both files. Advantageously, in accordance with the techniques introduced here, even encrypted data blocks can be shared, to avoid duplication. In a more complicated example, data blocks can be coalesced so as to be shared between volumes or other types of logical containers. Note that this coalescing operation involves modifying the indirect blocks that pointed to data blocks 294 and 285, and so forth, up to the root node. In a write out-of-place file system, that involves writing those modified blocks to new locations on disk.

The problem exists today of how to identify duplicate data blocks in an efficient yet reliable way, particularly in a manner which integrates well with the above described functionality. The FBNs cannot reliably be used for this purpose, since the same block can be assigned different FBNs in different files, or even within a given file. Therefore, in certain embodiments, the storage server 2 generates a unique fingerprint for each data block before the data block is encrypted, as described above, which depends uniquely on the contents of the data block. This can be accomplished by applying the data block to a hash function, such as SHA-256 or SHA-512. Two or more identical data blocks will always have the same fingerprint. By comparing the fingerprints during a subsequent deduplication process, duplicate data blocks can be identified and coalesced (data blocks with identical fingerprints are duplicates), even though they are encrypted.

Because the fingerprint of a block is much smaller than the data block itself, fingerprints for a very large number of data blocks can be stored without consuming a significant portion of the storage capacity in the system. Furthermore, each fingerprint can be digitally signed so as to prevent or at least detect any tampering. Any conventional or convenient algorithm for creating digital signatures can be used for this purpose. The generation of fingerprints for data blocks can be performed in parallel with the compression and/or encryption of the data blocks during a consistency point, as described above.

The particular time and manner in which deduplication is performed are not germane to the techniques introduced here in need not be discussed herein. Note, however, that the integration of fingerprinting, compression and encryption within the storage operating system 27, and particularly with the consistency point process, greatly facilitates and simplifies the co-implementation of these functions.

Thus, a network storage server with integrated encryption, compression and deduplication capability, along with associated methods, have been described. The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), etc.

Software or firmware to implement the techniques introduced here may be stored on a machine-readable medium and may be executed by one or more general-purpose or special-purpose programmable microprocessors. A "machine-readable medium", as the term is used herein, includes any mechanism that provides (i.e., stores and/or transmits) information in a form accessible by a machine (e.g., a computer, network device, personal digital assistant (PDA), any device with a set of one or more processors, etc.). For example, a machine-accessible medium includes recordable/non-recordable media (e.g., read-only memory (ROM); random access memory (RAM); magnetic disk storage media; optical storage media; flash memory devices; etc.), etc.

The term "logic", as used herein, can include, for example, special-purpose hardwired circuitry, software and/or firmware in conjunction with programmable circuitry, or a combination thereof.

Although the present invention has been described with reference to specific exemplary embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense.

What is claimed is:

1. A method of operation of a network storage server, the method comprising:
   receiving a plurality of write requests at the network storage server from a set of clients;
   buffering a plurality of data blocks written by the write requests in a cache in the network storage server;
   during a consistency point process that is characterized by committing the plurality of buffered data blocks written by the write requests and stored in the cache to a nonvolatile mass storage facility, using a storage operating system in the network storage server to,
   compress each of the data blocks,
   encrypt each of the data blocks,
   for each of the data blocks, in parallel with compressing and encrypting the data block, hash an unencrypted version of the data block to generate a fingerprint of the data block, and
   store the compressed and encrypted data blocks in the nonvolatile mass storage facility; and
   enabling at least one of the encrypted data blocks to be shared by a plurality of logical containers, including using the fingerprints of the data blocks to identify duplicate data blocks.

2. A method as recited in claim 1, wherein using the storage operating system to encrypt each of the data blocks comprises using a file system manager to encrypt the data blocks.

3. A method as recited in claim 1, wherein enabling at least one of the encrypted data blocks to be shared by a plurality of logical containers comprises:
   storing the fingerprint of each data block in a memory; and
   coalescing the duplicate data blocks.

4. A method as recited in claim 1, wherein the network storage server maintains data in a hierarchical structure that includes a plurality of direct blocks as a lowest level of the hierarchical structure and a plurality of levels of indirect blocks logically above the direct blocks in the hierarchical structure.

5. A method as recited in claim 1, wherein using the storage operating system comprises using a plurality of encryption keys to encrypt data blocks.

6. A method as recited in claim 1, wherein the storage operating system maintains a plurality of logical containers at a plurality of levels of granularity;
   the method further comprising enabling logical containers at each of the plurality of levels of granularity to be encrypted, by enabling encryption keys to be assigned to logical containers in each of the plurality of levels of granularity.

7. A method as recited in claim 1, further comprising using the storage operating system in the network storage server to digitally sign each of the data blocks, prior to storing each of the compressed and encrypted data blocks in the nonvolatile mass storage facility.

8. A method as recited in claim 1, further comprising:
   responding to a read request from one of the set of clients, by using the storage operating system in the network storage server to,
   access one of the compressed and encrypted data blocks in the nonvolatile mass storage facility;
   decrypt and decompress the accessed data block; and
   send the decrypted and decompressed data block to the client.

9. A method as recited in claim 2, wherein using the storage operating system to compress each of the data blocks comprises using the file system manager to compress the data blocks.

10. A method as recited in claim 3, further comprising:
    generating a digital signature for each said fingerprint, prior to storing the fingerprint in the memory; and
    using the digital signatures of the fingerprints to detect tampering in one of the fingerprints.

11. A method as recited in claim 4, wherein using the storage operating system to encrypt each of the data blocks comprises encrypting direct data blocks affected by the write requests but not indirect blocks affected by the write requests.

12. A method as recited in claim 4, wherein using the storage operating system to encrypt each of the data blocks comprises encrypting direct data blocks affected by the write requests and indirect blocks affected by the write requests.

13. A method as recited in claim 4, further comprising determining how many levels of indirect data blocks to encrypt, based upon a user-specified setting.

14. A method as recited in claim 5, wherein using the storage operating system to encrypt each of the data blocks comprises, for each of the data blocks, using a virtual volume block number of the data block and an encryption key to encrypt the data block, the virtual volume block number representing an address of the data block within a virtual volume that contains the data block.

15. A method as recited in claim 5,
    wherein the storage operating system maintains data in a plurality of volumes, each volume containing a plurality of data blocks; and
    wherein using the storage operating system to encrypt each of the data blocks comprises using a different encryption key for each of the volumes.

16. A method as recited in claim 6, for each logical container to which an encryption key is assigned, storing said encryption key in a metadata container associated with the logical container.

17. A method as recited in claim 5, further comprising encrypting each of the encryption keys with a wrapper encryption key.

18. A method as recited in claim 5, further comprising changing an encryption key to be used for a set of data blocks at each of a plurality of consistency points.

19. A method as recited in claim 6, wherein enabling logical containers at each of the plurality of levels of granularity to be encrypted comprises:
    encrypting data at two or more levels of granularity in accordance with user inputs that specify logical containers to be encrypted at two or more levels of granularity.

20. A method as recited in claim 19, wherein the plurality of levels of granularity comprise file level, directory level and volume level.

21. A method as recited in claim 20, wherein enabling logical containers at each of the plurality of levels of granularity to be encrypted comprises:
  encrypting data blocks of a file with a first encryption key; and
  encrypting a directory which contains the file with a second encryption key.

22. A method as recited in claim 21, wherein enabling logical containers at each of the plurality of levels of granularity to be encrypted further comprises:
  encrypting a volume which contains the directory with a third encryption key.

23. A non-transitory machine-readable medium comprising program code, the program code to:
  receive a plurality of write requests at a network storage server from a set of clients;
  buffer a plurality of data blocks written by the write requests in a cache in the network storage server;
  during a consistency point process that is characterized by committing the plurality of buffered data blocks written by the write requests and stored in the cache to a nonvolatile mass storage facility, use a storage operating system in the network storage server to,
    compress each of the data blocks,
    encrypt each of the data blocks,
    for each of the data blocks, in parallel with compression and encryption of the data block, hash an unencrypted version of the data block to generate a fingerprint of the data block, and
    store the compressed and encrypted data blocks in the nonvolatile mass storage facility; and
  enable at least one of the encrypted data blocks to be shared by a plurality of logical containers, including using the fingerprints of the data blocks to identify duplicate data blocks.

24. An apparatus comprising:
a processor; and
a machine-readable medium having program code executable by the processor to cause the apparatus to:
  receive a plurality of write requests at the apparatus from a set of clients;
  buffer a plurality of data blocks written by the write requests in a cache in the apparatus;
  during a consistency point process that is characterized by committing the plurality of buffered data blocks written by the write requests and stored in the cache to a nonvolatile mass storage facility, use a storage operating system in the apparatus to,
    compress each of the data blocks,
    encrypt each of the data blocks,
    for each of the data blocks, in parallel with compression and encryption of the data block, hash an unencrypted version of the data block to generate a fingerprint of the data block, and
    store the compressed and encrypted data blocks in the nonvolatile mass storage facility; and
  enable at least one of the encrypted data blocks to be shared by a plurality of logical containers, including using the fingerprints of the data blocks to identify duplicate data blocks.

* * * * *